(12) United States Patent
Lambert et al.

(10) Patent No.: US 11,907,384 B2
(45) Date of Patent: Feb. 20, 2024

(54) BASEBOARD MANAGEMENT CONTROLLER (BMC) TEST SYSTEM AND METHOD

(71) Applicant: Dell Products, L.P., Round Rock, TX (US)

(72) Inventors: Timothy M. Lambert, Austin, TX (US); Eugene David Cho, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 467 days.

(21) Appl. No.: 17/337,686

(22) Filed: Jun. 3, 2021

(65) Prior Publication Data

US 2022/0390517 A1 Dec. 8, 2022

(51) Int. Cl.
| | |
|---|---|
| *G06F 21/62* | (2013.01) |
| *G06F 11/273* | (2006.01) |
| *G06F 21/70* | (2013.01) |
| *G06F 21/71* | (2013.01) |
| *G01R 31/3185* | (2006.01) |
| *G01R 31/317* | (2006.01) |
| *G01R 31/3183* | (2006.01) |

(52) U.S. Cl.
CPC ............ *G06F 21/62* (2013.01); *G06F 11/273* (2013.01); *G06F 11/2733* (2013.01); *G06F 11/2736* (2013.01); *G06F 21/629* (2013.01); *G06F 21/70* (2013.01); *G06F 21/71* (2013.01); *G01R 31/3183* (2013.01); *G01R 31/31713* (2013.01); *G01R 31/31719* (2013.01); *G01R 31/31727* (2013.01); *G01R 31/318597* (2013.01); *G06F 2221/2141* (2013.01)

(58) Field of Classification Search
CPC .... G06F 11/26; G06F 11/273; G06F 11/2733; G06F 11/2736; G06F 2221/2141; G06F 21/62; G06F 21/71
See application file for complete search history.

(56) References Cited

U.S. PATENT DOCUMENTS

| | | | |
|---|---|---|---|
| 10,184,976 B2 * | 1/2019 | Song | G01R 31/31727 |
| 11,593,462 B2 * | 2/2023 | Boyd | G06F 9/4401 |
| 11,593,487 B2 * | 2/2023 | Cho | G06F 21/572 |
| 11,669,336 B2 * | 6/2023 | Lambert | G06F 9/4405 713/2 |
| 11,714,696 B2 * | 8/2023 | Cho | G06F 11/3058 714/55 |

(Continued)

*Primary Examiner* — Jason M Crawford
(74) *Attorney, Agent, or Firm* — Fogarty LLP

(57) ABSTRACT

An Information Handling System (IHS) includes multiple hardware devices, and a baseboard Management Controller (BMC) in communication with the plurality of hardware devices. The BMC includes a first processor configured to execute a custom BMC firmware stack, and a second processor including executable instructions for receiving a request to perform a test on the first processor in which the request is received through a secure communication session established with a remote IHS. The instructions further perform the acts of controlling the first processor to perform the test according to the request, the first processor generating test results associated with the test, and transmitting the test results to the remote IHS through the secure communication session.

20 Claims, 4 Drawing Sheets

(56) References Cited

U.S. PATENT DOCUMENTS

| | | | | |
|---|---|---|---|---|
| 2015/0106660 A1* | 4/2015 | Chumbalkar | ....... | G06F 11/3058 |
| | | | | 711/104 |
| 2019/0095593 A1* | 3/2019 | Cisneros | ............... | H04L 9/0897 |
| 2022/0237298 A1* | 7/2022 | Lambert | ............... | G06F 21/575 |
| 2022/0390517 A1* | 12/2022 | Lambert | ............. | G06F 11/2733 |
| 2022/0398320 A1* | 12/2022 | Maddukuri | ............. | G06F 21/31 |
| 2023/0034526 A1* | 2/2023 | Cho | .................... | G06F 11/1417 |
| 2023/0100958 A1* | 3/2023 | Dambal | ................ | G06F 21/572 |
| | | | | 713/189 |

* cited by examiner

BASEBOARD MANAGEMENT CONTROLLER (BMC) TEST SYSTEM AND METHOD

FIELD

The present disclosure generally relates to computing devices, and, more particularly, to a baseboard management controller (BMC) test system and method.

BACKGROUND

An Information Handling System (IHS) generally refers to any computing system that processes, compiles, stores, and/or communicates information or data for business, personal, or other purposes. Modern day IHS administrative management is often provided via baseboard management controllers (BMCs). The baseboard management controller (BMC) generally includes a specialized microcontroller embedded in the IHS, and may provide an interface between system-management software and platform hardware. Different types of sensors built into the IHS report to the BMC on parameters such as temperature, cooling fan speeds, power status, operating system (O/S) status, and the like. The BMC monitors the sensors and can send alerts to a system administrator via the network if any of the parameters do not stay within pre-set limits, indicating a potential failure of the system. The administrator can also remotely communicate with the BMC to take certain corrective actions, such as resetting or power cycling the system to get a hung O/S running again. These abilities can often save on the total cost of ownership of an IHS, particularly when implemented in large clusters, such as server farms.

SUMMARY

According to one embodiment, an Information Handling System (IHS) includes multiple hardware devices, and a baseboard Management Controller (BMC) in communication with the plurality of hardware devices. The BMC includes a first processor configured to execute a custom BMC firmware stack, and a second processor including executable instructions for receiving a request to perform a test on the first processor in which the request is received through a secure communication session established with a remote IHS. The instructions further perform the acts of controlling the first processor to perform the test according to the request, the first processor generating test results associated with the test, and transmitting the test results to the remote IHS through the secure communication session.

According to another embodiment, a method includes the steps of receiving a request to perform a test on a first processor in which the request is received through a secure communication session established with a remote IHS. The first and second processors are configured on a baseboard management controller (BMC), and are in communication with multiple hardware devices of an information handling system (IHS). Additionally, the second processor is coupled to multiple test access ports (TAPs) of the first processor. The method further includes the steps of controlling, using the instructions, the first processor to perform the test according to the request, and transmitting, using the instructions, the test results to the remote IHS through the secure communication session.

According to yet another embodiment, a BMC includes a first processor having multiple test access ports (TAPs) in communication with a second processor. The second processor includes executable instructions for receiving a request to perform a test on the first processor in which the request received through a secure communication session established with a remote IHS, controlling the first processor to perform the test according to the request, the first processor generating test results associated with the test, and transmitting the test results to the remote IHS through the secure communication session.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
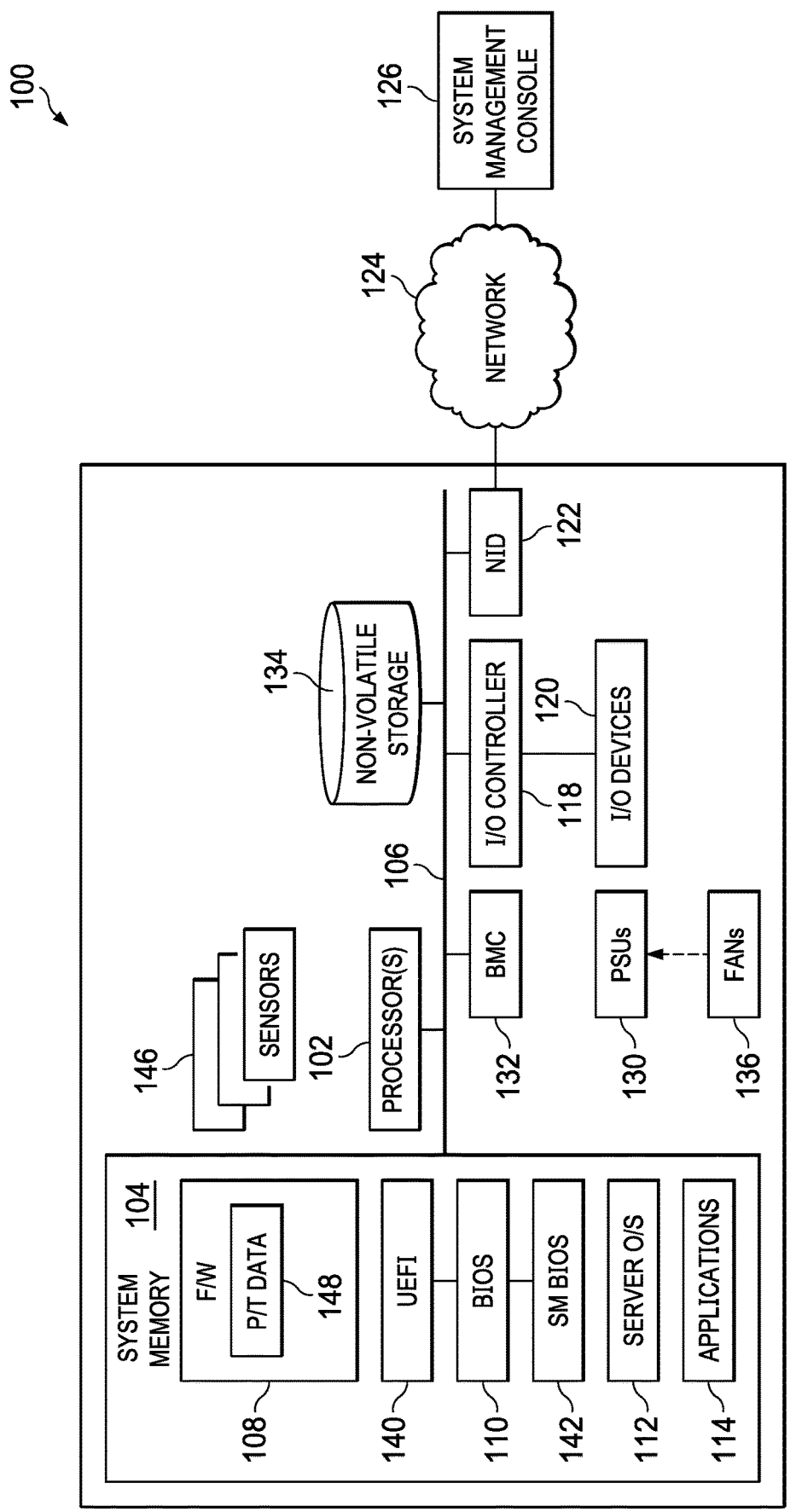
FIG. 1 is a block diagram of examples of components of an Information Handling System (IHS), according to some embodiments.

Embodiments described herein comprise systems and methods for using a second processor (e.g., coprocessor) configured on a BMC to provide test capabilities to a first processor (e.g., ARM processor) that executes a custom BMC firmware stack. Whereas custom BMC firmware stacks may be created and implemented with little or no control over how the BMC hardware or its associated IHS is configured, they may exhibit certain problems that, if not resolved, can inflict damage to the IHS or even the BMC hardware itself. Embodiments of the present disclosure provide a solution to this problem, among others, using a system and method that enables debug capabilities for the ARM processors that run these custom BMC firmware stacks so that problems inherent in their design and implementation may be solved at an at-scale level (e.g., debugged in the field).

BMC firmware is normally proprietary and is often developed by the vendor and shipped along with the BMC to the end user. Nevertheless, industry trends have migrated toward custom BMC firmware stacks (e.g., operating systems) that allow the end user greater control over how the BMC operates. OpenBMC is one example standard under which custom BMC firmware stacks may be generated. In general, openBMC is a collaborative open-source Linux distribution for BMCs meant to work across heterogeneous systems that include enterprise, high-performance computing (HPC), telecommunications, and cloud-scale data centers.

While custom BMC firmware stacks, such as those implemented according to openBMC standards, may provide enhanced manageability, transparency, and customization, its implementation has not been without drawbacks. For example, standard BMC firmware stacks are often implemented by the vendor of the IHS in which the BMC is deployed and therefore, the quality and reliability of the BMC's functionality can be controlled to a relatively good degree. One example of such a standard BMC firmware stack is the iDRAC firmware stack provided by the DELL TECHNOLOGIES. On the other hand, custom BMC firmware stacks, which are typically developed in uncontrolled environments, often possess relatively higher levels of software faults (e.g., bugs).

This drawback can be particularly problematic when certain control functions allocated to the BMCs can ruin or damage their respective IHSs if not properly managed. For example, whereas BMCs may be configured to control the fan speed of any of a number of fans configured in the IHS, either inadvertent or malicious algorithms within the custom BMC firmware stack can cause the fans to turn too slowly, thus yielding an overheating condition which in turn may cause physical damage. As another example, modern day BMCs are often configured with small memory components (e.g., an electronic multimedia card (eMMC)) due to their relatively low cost and small size; nevertheless, excessive read/write cycle rates caused by custom BMC firmware stack algorithms can cause damage to these memory components. Embodiments of the present disclosure provide a remote BMC test system and method that enable remote test procedures to be performed on BMCs that may execute error prone custom BMC firmware stacks, thus reducing or alleviating problems that may be introduced due to their inherently reduced level of reliability relative to their standard BMC firmware stack counterparts.

BMCs are particularly useful for remote diagnostics and maintenance and as such, many IHSs that are implemented with BMCs are configured in server clusters (a.k.a., server farms) where hundreds if not thousands of IHSs may be deployed. While such BMCs may provide good utility for remotely diagnosing issues with their host IHSs in the field, their utility can become severely hampered when the BMCs themselves cease to function properly. Furthermore, custom BMC firmware stacks that are inherently less reliable than their standard BMC firmware stack counterparts should be able to be diagnosed at an at-scale level (e.g., deployed in the field), but conventional diagnostic techniques for BMCs heretofore have not provided for such capabilities. At-scale debugging generally refers to the discipline of diagnosing and fixing (e.g., debugging) software and hardware problems of IHSs while deployed in the field and providing services in accordance with their intended purpose. Accordingly, embodiments of the present disclosure provide a system and method for field diagnosis and repair of BMCs, such as those that may be configured with custom BMC firmware stacks.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, science, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price.

The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components.

FIG. 1 is a block diagram of examples of components of an Information Handling System (IHS), according to some embodiments. Particularly, IHS 100 includes one or more processor(s) 102 coupled to system memory 104 via system interconnect 106. System interconnect 106 may include any suitable system bus. System memory 104 may include a plurality of software and/or firmware modules including firmware (F/W) 108, basic input/output system (BIOS) 110, operating system (O/S) 112, and/or application(s) 114. Software and/or firmware module(s) stored within system memory 104 may be loaded into processor(s) 102 and executed during operation of IHS 100.

F/W 108 may include a power/thermal profile data table 148 that is used to store power profile data and thermal profile data for certain hardware devices (e.g., processor(s) 102, system memory 104, non-volatile storage 134, NID 122, I/O controllers 118, etc.). System memory 104 may include a UEFI interface 140 and/or a SMBIOS interface 142 for accessing the BIOS as well as updating BIOS 110. In general, UEFI interface 140 provides a software interface between an operating system and BIOS 110. In many cases, UEFI interface 140 can support remote diagnostics and repair of computers, even with no operating system installed. SMBIOS interface 142 can be used to read management information produced by BIOS 110 of an IHS 100. This feature can eliminate the need for the operating system to probe hardware directly to discover what devices are present in the computer.

IHS 100 includes one or more input/output (I/O) controllers 118 which manages the operation of one or more connected input/output (I/O) device(s) 120, such as a keyboard, mouse, touch screen, microphone, a monitor or display device, a camera, a microphone, audio speaker(s) (not shown), an optical reader, a universal serial bus (USB), a card reader, Personal Computer Memory Card International Association (PCMCIA) slot, and/or a high-definition multimedia interface (HDMI), which may be included or coupled to IHS 100.

IHS 100 includes Network Interface Device (NID) 122. NID 122 enables IHS 100 to communicate and/or interface with other devices, services, and components that are located externally to IHS 100. These devices, services, and components, such as a system management console 126, can interface with IHS 100 via an external network, such as network 124, which may include a local area network, wide area network, personal area network, the Internet, etc.

IHS 100 further includes one or more power supply units (PSUs) 130. PSUs 130 are coupled to a BMC 132 via an I²C bus. BMC 132 enables remote operation control of PSUs 130 and other components within IHS 100. PSUs 130 power the hardware devices of IHS 100 (e.g., processor(s) 102, system memory 104, non-volatile storage 134, NID 122, I/O controllers 118, PSUs 130, etc.). To assist with maintaining temperatures within specifications, an active cooling system, such as one or more fans 136 may be utilized.

IHS 100 further includes one or more sensors 146. Sensors 146 may, for instance, include a thermal sensor that is in thermal communication with certain hardware devices that generate relatively large amounts of heat, such as processors 102 or PSUs 130. Sensors 146 may also include voltage sensors that communicate signals to BMC 132 associated with, for example, an electrical voltage or current at an input line of PSU 130, and/or an electrical voltage or current at an output line of PSU 130.

BMC 132 may be configured to provide out-of-band management facilities for IHS 100. Management operations may be performed by BMC 132 even if IHS 100 is powered off, or powered down to a standby state. BMC 132 may include a processor, memory, and an out-of-band network interface separate from and physically isolated from an in-band network interface of IHS 100, and/or other embedded resources.

In certain embodiments, BMC 132 may include or may be part of a Remote Access Controller (e.g., a DELL Remote Access Controller (DRAC) or an Integrated DRAC (iDRAC)). In other embodiments, BMC 132 may include or may be an integral part of a Chassis Management Controller (CMC).

Figure 2:
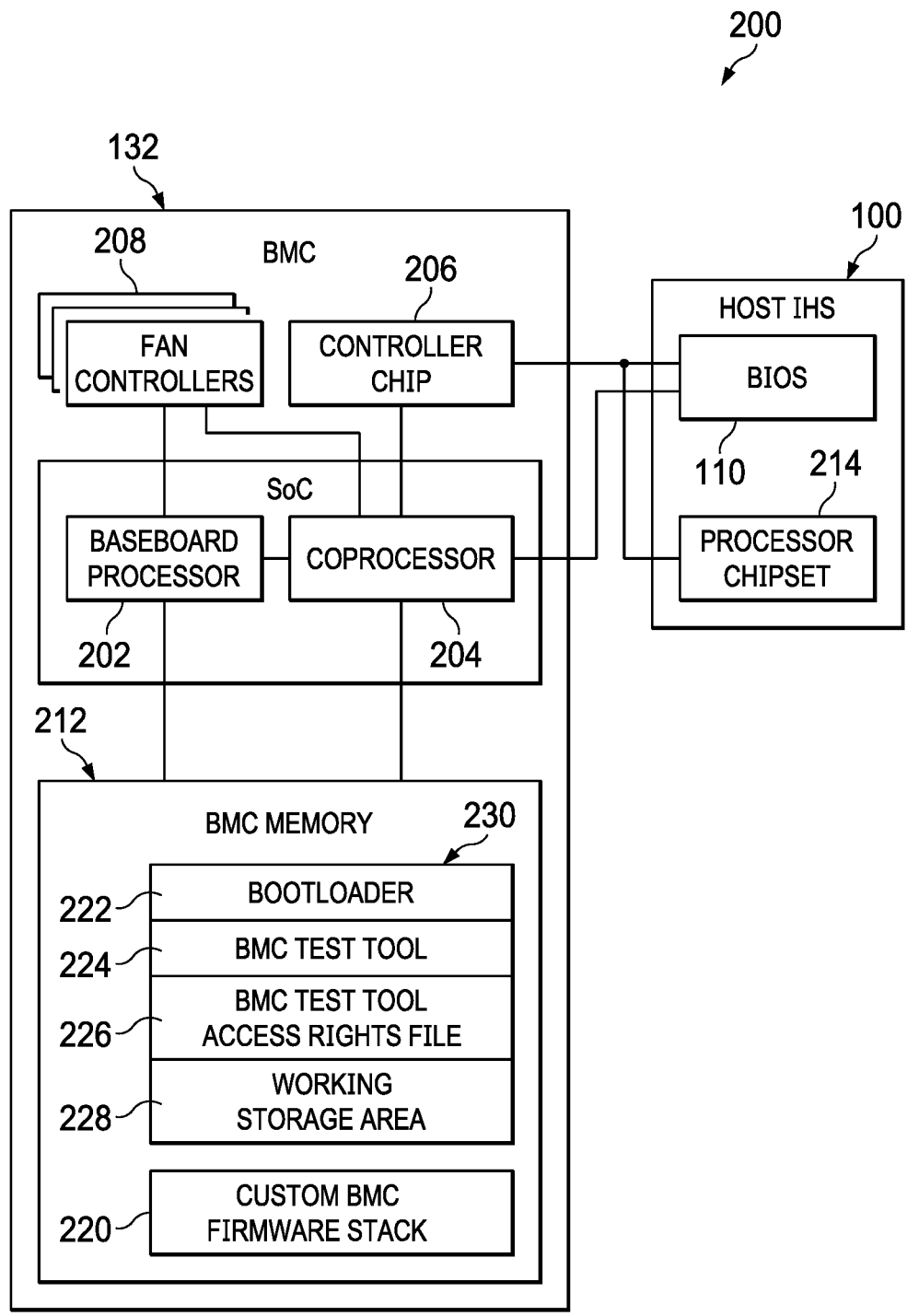
FIG. 2 is a diagram illustrating several components of an example BMC along with those of an associated IHS that may be used to implement a remote BMC test system according to one embodiment of the present disclosure.

FIG. 2 is a diagram illustrating several components of an example BMC 132 along with those of an associated IHS 100 that may be used to implement a remote BMC test system 200 according to one embodiment of the present disclosure. BMC 132 generally includes a baseboard processor 202, a coprocessor 204, a controller chip 206, one or more fan controllers 208, and a BMC memory 212. The IHS 100 on the other hand, is shown including a BIOS 110, and a processor chipset 214. As shown, the baseboard processor 202 and coprocessor 204 may be provided together in a system on chip device 216. In other embodiments, the baseboard processor 202 and coprocessor 204 may be provided as discreet entities. The BMC 132 and IHS 100 are shown with those components described above for purposes of brevity and clarity of discussion. It should be appreciated, however, that either of the BMC 132 and/or IHS 100 may be configured with additional, fewer, or different components without departing from the spirit and scope of the present disclosure.

The BMC memory 212 may be integrally formed with the baseboard processor 202, coprocessor 204, and/or controller chip 206, or it may be discreetly separate therefrom. In one embodiment, the BMC memory 212 may be implemented on a memory device (e.g., an electronic multimedia card (eMMC), an electronic universal flash storage (eUFS), or a low-power double data rate (LPDDR) memory device, etc.). The BMC memory 212 is configured to store a bootloader 222, a BMC test tool 224, a BMC test tool access rights file 226, a working storage area 228, and a custom BMC firmware stack 220. The bootloader 222, BMC test tool 224, BMC test tool access rights file 226, and working storage area 228 may be stored in a private storage segment 230 that is hidden or otherwise unavailable to the custom BMC firmware stack 220. For example, the coprocessor 204 may include executable logic for creating a private memory mapped file within the BMC memory 212. Thus, the BMC memory 212 may be configured with a private storage segment 230 comprised of a private memory mapped file as well as a custom BMC firmware stack 220 that is publicly accessible by the baseboard processor 202. The private storage segment 230 configured as a private memory mapped file generally comprises a data structure created by a memory manager of the coprocessor 204, or other suitable processor in the system 200, to map a region of the BMC 212 memory to its process address space. More specifically, the memory manager of the coprocessor 204 may mark the private memory mapped file as invalid from a typical processing perspective, but generates private memory mapped file access information (e.g., hooks or handles) that allows access to its contents. The private memory mapped file access information, however, may be provided to the coprocessor 204 so that it may perform one or more administrative functions over the baseboard processor 202 described herein.

The BMC test tool 224 includes executable logic for performing certain tests on the baseboard processor 202. In one embodiment, the BMC test tool 224 may be configured to perform the tests according to a joint test action group (JTAG) specification. The JTAG may also be referred to as a standard test access port and boundary scan architecture protocol, which is the IEEE 1149.1 standard certified by the Institute of Electrical and Electronics Engineers (IEEE). The BMC test tool 224 may perform tests, such as single stepping, breakpointing, accessing registers or memory of a target processor (e.g., baseboard processor 202), boundary scan testing, generating and accessing core dumps. Additional details of how the BMC test tool 224 functions will be described in detail herein below.

The bootloader 222 may include any type of executable code for launching or booting the custom BMC firmware stack 220 on the BMC 132. In one embodiment, the bootloader 222 includes a Universal boot loader (Das U-Boot), which is provided under an open source license, and is primarily adapted for use in embedded processor devices to bootstrap the BMC firmware stack's operating system's kernel.

The BMC test tool access rights file 226 stores information associated with user rights indicating one or more test types that are allowed to be performed via the secure communication session with the BMC test tool 224. The secure communication session in turn, is associated with an account for which the rights have been established with a user of the IHS 100. For example, the BMC test tool 224 may manage login sessions with each secure communication session, and allocate certain tests to be conducted according to a subscription negotiated between a user of the IHS 100 and an administrator of the IHS 100. The administrator may be any entity that oversees, guarantees, or warranties the operation of the IHS 100, such as a vendor that assembled, manufactured, sold, or otherwise provided the IHS 100 to the user.

For example, the BMC test tool 224 may provide for authentication of a secure communication session using any suitable means, such as using a username/password combination, passcode, fingerprint scan, and the like, to ensure the identity of a user of the IHS 100. Once authenticated, the BMC test tool 224 may access the BMC test tool access rights file 226 to identify a subscription (e.g., account) of the secure communication session, and any particular access rights (AR) associated with that account. Using the access rights associated with that secure communication session, the BMC test tool 224 may then execute certain test algorithms according to the access rights of the secure communication session.

The secure communication session may be any type that provides a local user interface (e.g., host system management console 126) or remote user interface for receiving user input for administering the tests of the BMC test tool 224, as well as displaying test results of those tests for consumption by the user. For example, the secure communication session may be a GNU Debugger, which is provided under a general public license (GPL) by the GNU PROJECT.

Although the foregoing disclosure describes one example embodiment of administering test types that may be performed based on an account of the user, it should be appreciated that other techniques may be used for administering test procedures based on an account of the user without departing from the spirit and scope of the present disclosure. For example, access rights for the test types that are allowed to be performed on each BMC 132 may be administered by a cloud service in communication with the coprocessor 204 of the BMC 132. As another example, access rights for the test types that are allowed to be performed on each BMC 132 may be administered by a processor other than the coprocessor 204, such as by a processor 102 configured on the host IHS 100.

Baseboard processor 202 may include any suitable type of processor, such as an advanced RISC machine (ARM) processor. Baseboard processor 202 executes a standard BMC firmware stack (not shown) or a custom BMC firmware stack 220 that is stored in a BMC memory 212. A standard BMC firmware stack may be, for example, an IHS vendor provided firmware stack (e.g., an iDRAC provided by the DELL CORPORATION), while the custom BMC firmware stack 220 may be one created by a user of the IHS, such as one implemented using the openBMC framework. The custom BMC firmware stack 220 may provide out-of-band monitoring and management of the components of the IHS 100. Monitoring functions that the custom BMC firmware stack 220 may provide include, for example, monitoring internal ambient temperatures and/or voltages in the IHS 100, along with monitoring CPU, memory, and network usage levels, and the like. Examples of management features may include installation of software including the base operating system, of the IHS 100, controlling fan speed of one or more fans in the IHS 100, turning certain resources of the IHS 100 on or off, and the like.

Coprocessor 204 functions independently of baseboard processor 202 to assist the ARM processor in performing one or more functions associated with the operation of the BMC 132. Custom BMC firmware stacks 220 are typically created by users whose development efforts are not closely controlled by the vendor of the IHS 100 and as such, it may include logic that may not be aware of all of the intricacies of the IHS 100 it is designed to manage. Thus, the coprocessor 204 may be configured with logic for providing out-of-band monitoring of these custom BMC firmware stacks 220. That is, the coprocessor 204 may, in certain cases, be considered to operate out-of-band with respect to the baseboard processor 202 because the actions of the BMC test tool 224 function independently or is not controller by those of the baseboard processor 202. According to embodiments of the present disclosure, the coprocessor 204 may also be configured to perform certain tests on the baseboard processor 202 to ensure proper operation of the custom BMC firmware stacks 220. Thus, the coprocessor 204 may provide testing capabilities of the baseboard processor 202 regardless of what type of logic that it is implemented with. Additionally, embodiments of the present disclosure may provide test capabilities over other processors configured in the IHS 100, such as the controller chip 206, or other peripheral systems (e.g., PERC controllers, etc.).

Controller chip 206 includes logic for controlling certain features of the IHS 100 and/or BMC 132. In one embodiment, a Complex Programmable Logic Device (CPLD) can be used to implement the controller chip. For example, the controller chip 206 may include logic for, in response to receiving certain input signals, activating or deactivating one or more signals or messages to the baseboard processor 202 and/or coprocessor 204. As another example, the controller chip 206 may include logic for disabling the baseboard processor 202 or coprocessor 204 by holding it in reset so that it cannot boot.

In one embodiment, the controller chip 206 includes logic for monitoring reboots performed by the coprocessor 204. When the baseboard processor is running a custom BMC firmware stack 220, it would be beneficial to inhibit the custom BMC firmware stack from hindering the coprocessor 204 from performing its duties. For example, when a custom BMC firmware stack 220 is loaded on the baseboard processor 202, the controller chip 206 may recognize this condition and in response, inhibit the ability of the custom BMC firmware stack 220 from resetting or accessing the memory, state, and/or configuration of the coprocessor 204.

Figure 3:
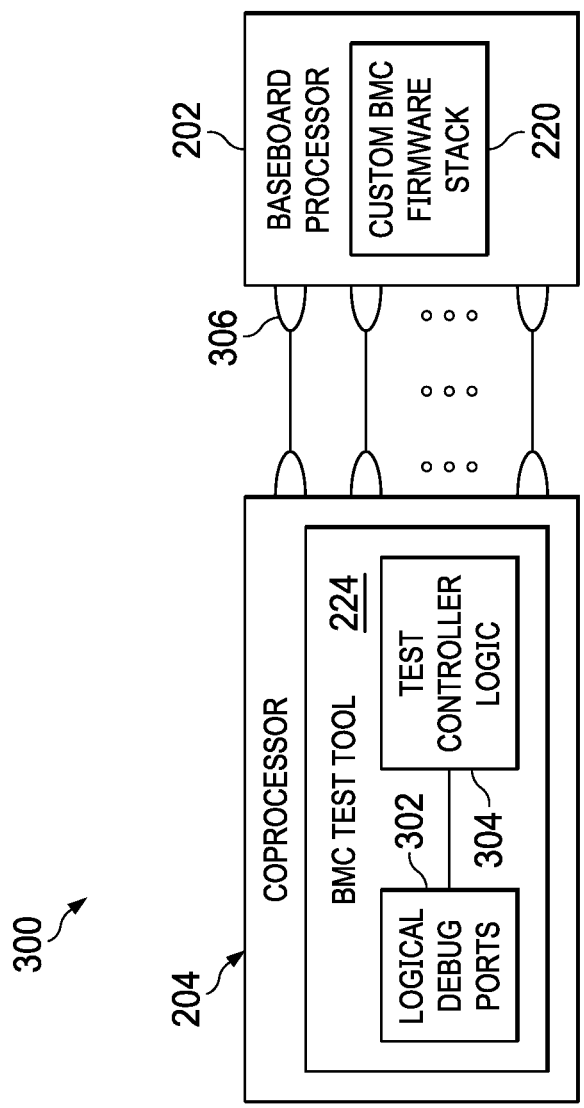
FIG. 3 illustrates an example arrangement of the coprocessor and baseboard processor that may be used to implement a BMC test system according to one embodiment of the present disclosure.

FIG. 3 illustrates an example arrangement of the coprocessor 204 and baseboard processor 202 that may be used to implement a BMC test system 300 according to one embodiment of the present disclosure. The BMC test tool 224 executed on the coprocessor 204 includes one or more logical debug ports 302 and test controller logic 304. Additionally, the baseboard processor 202 includes one or more test access ports (TAPs) 306 that are exposed for access by the coprocessor 204.

In one embodiment, the taps 306 may conform to those specified by the JTAG specification. For example, the taps 306 may include a test data in (TDI) test pin, a test data out (TDO) test pin, a test clock (TCK) test pin, a test mode select (TMS) test pin, and a test reset (TRST) test pin. In other embodiments, the taps 306 may comprise any exposed pin provided by the baseboard processor 202, such as data bus pins, address bus pins, control pins, and the like.

The test controller logic 304 can be considered to emulate the actions of a TAP controller, such as a JTAG compliant TAP controller. Executable code in the BMC test tool 3xx may set specified values in certain ones of the logical debug ports 302, and those values can be applied to the TAPs 306 of the baseboard processor 202 using the test controller logic 304. The specified values applied to the TAPs 306 essentially form a test that is administered by the BMC test tool 224. Results of the test can be accessed by the test controller logic 304 for determining, among other things, whether or not the baseboard processor 202 passed the test. For example, the test controller logic 304 may store the output of the TAPs 306 in other ones of the logical debug ports 302 and these obtained values compared against known values to perform a boundary scan test.

In one embodiment, the test controller logic 304 may also include code for, based on a triggering event indicating that the baseboard processor 202 exhibited a crash, accessing the registers and/or memory of the baseboard processor 202 (e.g., via the TAPs 306) to generate and store a dump file that may be temporarily stored in the working storage area 228, which may then be subsequently transferred to the user via the secure communication session.

In another embodiment, the test controller logic 304 may also include code for asserting certain TAPs 306 for performing a single step test and/or a breakpoint test. A single step test generally refers to a testing procedure in which the target processor is halted after each execution cycle for examination of various aspects (e.g., register states, processor state conditions, input/output logic levels applied to input/output pins, etc.) of the target processor's operation. The breakpoint test generally refers to one in which the processor is halted as a result of a specified condition being triggered so that the various aspects of the target processor can be examined.

While the coprocessor 204 as described above is configured to administer tests to a baseboard processor 202 of the BMC 132, it is contemplated that the coprocessor 204 may also be configured to administer tests to other systems or processors in the BMC 132 or IHS 100. For example, the coprocessor 204 may communicate with the controller chip 206 via a suitable communication path (e.g., serial peripheral interconnect (SPI) link, I2C link, etc.) to administer tests on the controller chip 206. For another example, the coprocessor 204 may communicate with other systems (e.g., power edge RAID controller (PERC), etc.) within the IHS 100 for administering tests, such as those described above, on these systems.

Although FIG. 3 describes one example of a BMC test system 300 that may be provided to administer tests on baseboard processor 202 and other processors or systems in the IHS 100, the features of the disclosed process may be embodied in other specific forms without deviating from the spirit and scope of the present disclosure. For example, the BMC test system 300 may perform additional, fewer, or different features than those described above. As another example, although the coprocessor 204 described above is well suited for administering tests on a baseboard processor 202 of the BMC 132, it is contemplated that the coprocessor 204 may be adapted to administer tests for other processors or systems in the IHS 100.

Figure 4:
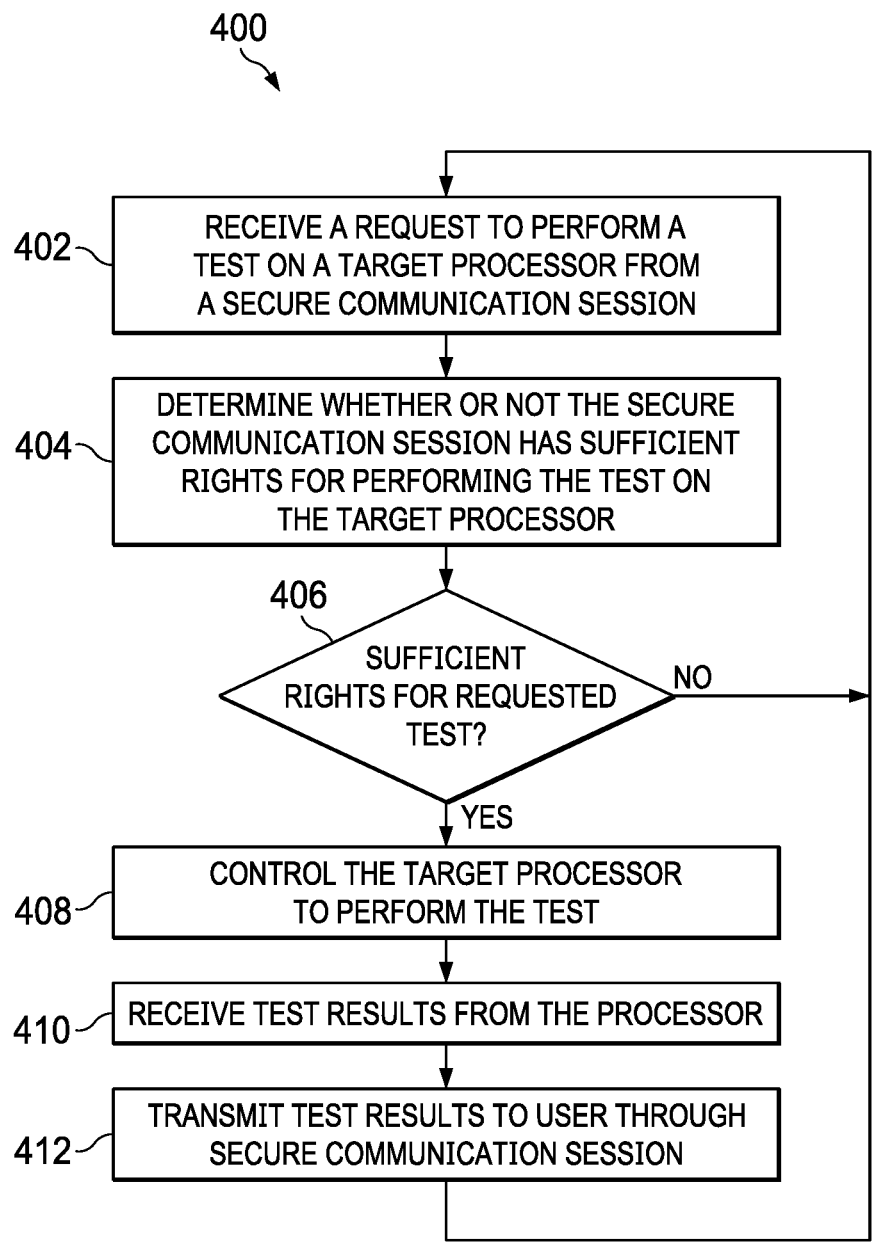
FIG. 4 illustrates an example custom BMC test method that may be performed to test a baseboard processor, such as one that executes a custom BMC firmware stack, according to one embodiment of the present disclosure.

FIG. 4 illustrates an example custom BMC test method 400 that may be performed to test a baseboard processor 202, such as one that executes a custom BMC firmware stack 220, according to one embodiment of the present disclosure. Initially, the BMC 132 is booted along with the host IHS 100 in which the BMC 132 is configured. In one embodiment, the baseboard processor 202 is started with a custom BMC firmware stack 220 that is particularly susceptible to faults or runtime errors that can be tested to alleviate those faults, particularly when the IHS 100 is currently deployed in an at-scale environment where troubleshooting those faults may be difficult to perform.

At step 402, the coprocessor 204 receives a request to perform a test on a target processor from a secure communication session. In one embodiment, the target processor is a baseboard processor 202 that is configured to execute a custom BMC firmware stack 220. In another embodiment, the target processor is a controller chip 206 configured on the BMC 132. In yet another embodiment, the target processor comprises one deployed on a peripheral system of the IHS 100, such as a PERC controller.

Additionally, the secure communication session may be a local secure communication session, such as one terminating at the host IHS 100, or a remote secure communication session, such as one terminated through a publicly accessible network, such as the Internet. For example, the secure communication session may be implemented with a GNU Debugger executable application. In one embodiment, the secure communication session is associated with an account that determines which types of tests are allowed on the BMC 132.

At step 404, the coprocessor 204 determines whether or not the secure communication session has sufficient rights for performing the test on the target processor. For example, the secure communication session may be associated with an account established with an administrator of the IHS 100 indicating what types of tests are allowed by that secure communication session. Thus at step 406, if the test is allowed, processing continues at step 408; otherwise, processing continues at step 402 to process ensuing requests for tests to be performed.

At step 408, the coprocessor 204 controls the target processor to perform the test. For example, the coprocessor 204 may set a trigger such that when a crash of the target processor occurs, it may access the target processor to generate a core dump of information that can be analyzed to determine why the crash occurred. As another example, the coprocessor 204 may control certain TAPs configured on the target processor for inputting certain data or setting conditions (e.g., setting certain register variables, etc.) that may be used to perform a boundary scan test.

At step 410, the coprocessor 204 receives test results from the target processor. For example, if the test comprises a boundary scan test, the coprocessor 204 may then compare the retrieved test results against known values that should exist for a properly functioning processor. Thereafter at step 412, the coprocessor 204 transmits the test results to the user via the secure communication session, and continues processing at step 402 to receive and process additional requests to perform other tests on the target processor or a different processor in the IHS 100. Nevertheless, when use of the method 400 is no longer needed or desired, the method 400 ends.

Although FIG. 4 describes one example of a method that may be performed test a target processor, the features of the disclosed process may be embodied in other specific forms without deviating from the spirit and scope of the present disclosure. For example, the method 400 may perform additional, fewer, or different operations than those operations as described in the present example. As another example, certain steps of the aforedescribed process may be performed by other components of the BMC 132 and/or IHS 100, such as by the controller chip 206 configured on the BMC 132, or by the BIOS 110 executed on the IHS 100.

It should be understood that various operations described herein may be implemented in software or software modules executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements that such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
 a plurality of hardware devices; and
 a baseboard management controller (BMC) in communication with the plurality of hardware devices, the BMC comprising:
  a first processor configured to execute a custom BMC firmware stack; and
  a second processor in communication with a plurality of test access ports (TAPs) of the first processor, the second processor configured to execute instructions stored in a memory unit to:
   receive a request to perform a test on the first processor, the request received through a secure communication session established with a remote IHS;
   control the first processor to perform the test according to the request, the first processor to generate test results associated with the test;
   transmit the test results to the remote IHS through the secure communication session.

2. The IHS of claim 1, wherein the instructions are further executed to:
 determine whether or not the secure communication session has sufficient rights for to perform the test on the first processor;
 disallow the test when the secure communication session does not have the sufficient rights,
 wherein the secure communication session is associated with an account for which the rights have been established, and
 wherein the rights indicate at least one of a plurality of test types that are allowed to be performed via the secure communication session.

3. The IHS of claim 2, wherein the account is configured to be modified, via an administrator of the account, to change which test types are allowed via the secure communication session.

4. The IHS of claim 2, wherein the test types comprise at least one of a boundary scan test, a processor single step test, a stop at breakpoint test, a register or memory access procedure, and a memory dump procedure.

5. The IHS of claim 1, wherein the first processor comprises an advanced RISC machine (ARM) processor, and the second processor comprises a coprocessor configured to assist the ARM processor to perform one or more functions associated with the operation of the BMC.

6. The IHS of claim 1, wherein the instructions are further executed to restrict the custom BMC firmware stack from being able to access a portion of the memory units that store the instructions.

7. The IHS of claim 1, wherein the instructions are further executed to perform the test to:
 generate input test data that is inputted into at least a portion of the TAPs of the first processor;
 receive output test data that is generated by the first processor on at least a second portion of the TAPs, the output test data comprising the test results.

8. The IHS of claim 1, wherein the TAPs comprise test pins corresponding to a JTAG specification, the test pins comprising a test data in (TDI) test pin, a test data out (TDO) test pin, a test clock (TCK) test pin, a test mode select (TMS) test pin, and a test reset (TRST) test pin.

9. The IHS of claim 1, wherein the instructions are further executed to perform the test by:
 when the first processor experiences a crash, save at least a portion of the working memory of the custom BMC firmware stack; and
 transmit the portion of working memory to the remote IHS via the secure communication session.

10. The IHS of claim 1, wherein the instructions are further executed to communicate with a third processor to:
 receive another request to perform another test on the third processor, the other request received through another secure communication session established with another remote IHS;
 control the third processor to perform the other test according to the other request, the third processor to generate test results associated with the other test;
 transmit the other test results to the other remote IHS through the other secure communication session.

11. The IHS of claim 1, wherein the third processor comprises at least one of a complex programmable logic device (CPLD) configured on the IHS, or a PERC processor.

12. A method comprising:
 receiving, using instructions stored in at least one memory and executed by at least one processor, a request to perform a test on a first processor, the request received through a secure communication session established with a remote IHS, the first and second process configured on a baseboard management controller (BMC) in communication with the plurality of hardware devices of an information handling system (IHS), the second processor in communication with a plurality of test access ports (TAPs) of the first processor;
 controlling, using the instructions, the first processor to perform the test according to the request, the first processor generating test results associated with the test;
 transmitting, using the instructions, the test results to the remote IHS through the secure communication session.

13. The method of claim 12, further comprising:
 determining whether or not the secure communication session has sufficient rights for performing the test on the first processor;
 disallowing the test when the secure communication session does not have the sufficient rights,
 wherein the secure communication session is associated with an account for which the rights have been established, and
 wherein the rights indicate at least one of a plurality of test types that are allowed to be performed via the secure communication session.

14. The method of claim 13, further comprising modifying the account to change which test types are allowed via the secure communication session.

15. The method of claim 12, further comprising restricting the custom BMC firmware stack from accessing a portion of the memory units that store the instructions.

16. The method of claim 12, further comprising performing the test by:

generating input test data that is inputted into at least a portion of the TAPs of the first processor; and receiving output test data that is generated by the first processor on at least a second portion of the TAPs, the output test data comprising the test results.

17. The method of claim 12, further comprising performing the test by:

when the first processor experiences a crash, save at least a portion of the working memory of the custom BMC firmware stack; and transmit the portion of working memory to the remote IHS via the secure communication session.

18. The method of claim 12, further comprising communicating with a third processor to:

receive another request to perform another test on the third processor, the other request received through another secure communication session established with another remote IHS;

control the third processor to perform the other test according to the other request, the third processor generating test results associated with the other test;

transmit the other test results to the other remote IHS through the other secure communication session.

19. A baseboard management controller (BMC) in communication with a plurality of hardware devices of an information handling system (IHS), the BMC comprising:

a first processor configured to execute a custom BMC firmware stack; and a second processor in communication with a plurality of test access ports (TAPs) of the first processor, the second processor configured to execute instructions stored in a memory unit to:

receive a request to perform a test on the first processor, the request received through a secure communication session established with a remote IHS;

control the first processor to perform the test according to the request, the first processor to generate test results associated with the test;

transmit the test results to the remote IHS through the secure communication session.

20. The BMC of claim 19, wherein the instructions are further executed to perform the test to:

generate input test data that is inputted into at least a portion of the TAPs of the first processor;

receive output test data that is generated by the first processor on at least a second portion of the TAPs, the output test data comprising the test results.

* * * * *